May 24, 1966 E. BRAUN ETAL 3,252,870
METHOD FOR CONTROLLING THE FERMENTATIVE
OXIDATION OF ALCOHOL TO ACETIC ACID
Filed Feb. 20, 1964 6 Sheets-Sheet 1

Inventors
Ernst Braun, Josef
Sagerschnig
By Richard Erb
Ag't

May 24, 1966 E. BRAUN ETAL 3,252,870
METHOD FOR CONTROLLING THE FERMENTATIVE
OXIDATION OF ALCOHOL TO ACETIC ACID
Filed Feb. 20, 1964 6 Sheets-Sheet 3

Inventors
Ernst Braun, Josef
Sagerschnig
By Richard ...

May 24, 1966  E. BRAUN ETAL  3,252,870
METHOD FOR CONTROLLING THE FERMENTATIVE
OXIDATION OF ALCOHOL TO ACETIC ACID
Filed Feb. 20, 1964  6 Sheets-Sheet 4

Inventors
Ernst Braun, Josef Sagerschnig
By Richard Ernst
agt

May 24, 1966  E. BRAUN ETAL  3,252,870
METHOD FOR CONTROLLING THE FERMENTATIVE
OXIDATION OF ALCOHOL TO ACETIC ACID
Filed Feb. 20, 1964  6 Sheets-Sheet 6

Inventors
Ernst Braun, Josef
Sagerschnig
By Richard Cmb
Ag't

United States Patent Office
3,252,870
Patented May 24, 1966

1

3,252,870
METHOD FOR CONTROLLING THE FERMENTATIVE OXIDATION OF ALCOHOL TO ACETIC ACID
Ernst Braun, Vienna, and Josef Sagerschnig, Klagenfurt, Karnten, Austria, assignors to Patentauswertung Vogelbusch Gesellschaft m.b.H., Vienna, Austria, a company of Austria
Filed Feb. 20, 1964, Ser. No. 346,333
3 Claims. (Cl. 195—49)

This invention relates to the fermentative oxidation of ethyl alcohol to acetic acid, and more particularly to the control of the fermentation medium.

Ethyl alcohol, hereinafter referred to as "alcohol," is oxidized to acetic acid by microorganisms of the genus Acetobacter in the presence of air. The fermentation is carried out on an industrial scale in the so-called "quick vinegar process" in which the alcohol bearing aqueous substrate is allowed to trickle over wood shavings carrying the microorganisms or like carriers having a large surface area exposed to ambient air. In another industrial method, the microorganisms are cultured while submersed in the substrate. Air is passed through the substrate in bubbles.

Both commercial processes are essentially batch processes although the liquid substrate may be circulated during fermentation in the quick vinegar process. When a sufficient amount of alcohol is converted to acetic acid, most of the fermentation mixture is drawn off and further processed in a manner not in itself relevant to this discussion. The microorganisms contained in the residual fermentation mixture are employed for starting conversion of the next batch.

The microorganisms are not viable in the absence of a minimum concentration of alcohol in the fermentation mixture. If a residue from a first batch operation is to be employed for starting fermentation of the next batch, it is essential that the first fermentation be stopped, and that fresh substrate be provided before the alcohol concentration drops below the minimum. The alcohol withdrawn with the fermentation mixture is practically lost. The economics of the process are unfavorably affected if fermentation is terminated while the mixture still contains more than the necessary minimum of alcohol.

It has heretofore been necessary to control the termination of fermentation according to chemical analysis of the fermentation mixture. Empirical tables are available for estimating the length of the fermentation period, but they furnish only approximate information which must be supplemented by more precise analysis.

Because of the control problems involved, it has heretofore not been possible to automatize the fermentative oxidation of alcohol, nor to make the process continuous. The oxidation of alcohol by means of microorganisms, as heretofore practiced, involves a relatively large expense for skilled labor.

It is a primary object of the invention to carry out the fermentative oxidation of alcohol to acetic acid practically without the intervention of an operator.

Another object of the invention is a continuous process, at least a continuous batch process, for oxidizing alcohol to acetic acid.

Other objects and advantages of this invention will become apparent as the disclosure proceeds.

We have found that the oxidation of alcohol to acetic acid by microorganisms can be carried out automatically if the withdrawal of a portion of the fermentation mixture from the fermentation zone, and the admixing of fresh alcohol bearing substrate to the residual mixture in the fermentation zone are controlled in response to the alcohol content of the waste gases withdrawn from the zone. The method of the invention is applicable to the quick vinegar process as well as to the submersed culture process. It will be described hereinafter with specific reference to the latter because operating conditions are more critical in the submersed culture process, but the invention is not limited to the embodiments discussed in more detail hereinafter.

When an aqueous alcohol bearing substrate, such as fermented mash, is processed in the presence of an excess of air at a temperature of 27° C., typical of industrial practice, conversion of alcohol to acetic acid takes place at the highest rate when the alcohol concentration in the fermentation mixture is approximately 5.5 percent by volume. It is a more specific object of the invention to maintain such an alcohol concentration in the fermentation mixture over a major portion of the fermentation period, and thereby to reduce the length of this period.

The optimum rate of air supply to the fermentation medium is substantially fixed for a given installation, and practically independent of the rate of alcohol conversion. A short fermentation period thus results in a saving of compressed air for equal acetic acid output. Some alcohol is unavoidably entrained with the waste gas which largely consists of excess air. A reduction in the amount of air used thus produces a concomitant decrease in the amount of alcohol lost with the waste gases. The invention aims at reducing the amount of air necessary for converting a fixed amount of alcohol to acetic acid, and to convert the alcohol to the acid at a better yield by reducing the loss of alcohol with the waste gas.

The alcohol content of the waste gases is a function of the temperature of the fermentation medium through which the air is passed, and of the alcohol concentration in the medium. The air which passes in bubbles through the aqueous liquid is quickly saturated with water and alcohol vapors to an extent practically corresponding to equilibrium. At a fixed temperature of the fermentation medium, the alcohol content of the waste gases is uniquely related to the alcohol concentration of the fermentation medium and virtually independent of other factors such as liquid level. It is customary to control the fermentation temperature within narrow limits. As has been disclosed in United States Patent No. 3,002,894, a signal indicative of the alcohol concentration in an aqueous liquid may readily be derived from analysis of a sample of a gas in equilibrium with the liquid. Signals generated in response to the alcohol content of the waste gases withdrawn from a fermentation mixture according to this invention are therefore employed for maintaining the desired optimal alcohol concentration during the several stages of the fermentation process.

According to the aforementioned patent, an alcohol bearing gas is contacted with an acid chromate solution, the color change from the orange chromate ion to the green chromium ion is sensed photometrically, and a signal is generated accordingly. Alternatively, the alcohol content of a gaseous mixture may be employed for generating a signal according to a method disclosed in United States Patent No. 3,010,881, in which the alcohol is oxidized by oxygen and the heat of reaction is sensed to produce a signal. The waste gases from the fermentative oxidation of alcohol contain an excess of oxygen which is necessary for the metabolism of the microorganisms employed, and thus are suitable for alcohol determination by oxidation and thermal analysis.

When the oxidation of alcohol vapor with the oxygen of the waste gases is carried out in the presence of a catalytic mixture of copper oxide and manganese dioxide, the alcohol is preferentially oxidized, and the acetic acid present in the vapors is not attacked. The catalytic oxidation can be carried out at relatively low temperatures, and the thermal effects of oxidation can therefore be observed with greater precision than after oxidation at high temperature in the absence of a catalyst.

According to one basic aspect of this invention, a fermentation mixture is discharged from the fermentation zone in response to a signal. This signal is generated when waste gas analysis indicates the presence of a desired minimum concentration of alcohol in the fermentation mixture. The lowest alcohol concentration at which microorganisms of the genus Acetobacter remain viable is approximately 0.1 to 0.15 percent by volume. At a temperature of 30° C. in the fermentation mixture, such a minimum concentration corresponds to an alcohol content of 0.31 to 0.475 gram per cubic meter.

According to another feature of the invention, a signal derived from the alcohol content of the waste gases may also be employed for replenishing the fermentation medium with fresh alcohol bearing aqueous substrate at a rate sufficient to maintain in the medium a desired alcohol concentration selected for a high rate of conversion to acetic acid, until a predetermined amount of substrate has been added. Addition of fresh substrate is then stopped, and the alcohol concentration is permitted to drop. A major portion of the fermentation medium is discharged from the fermentation zone when the alcohol concentration drops to a predetermined minimum value, preferably not substantially higher than the minimum concentration required to maintain the viability of the microorganisms. The discharge of the fermented mixture is preferably controlled by two-position controllers. The supply of fresh substrate may be controlled by controllers which operate in the proportional, the integral, or the derivative mode, or in any binary or the ternary combination of these modes.

When a substantially constant, relatively low alcohol concentration in the fermentation mixture during most of the fermentation period is maintained, the losses of alcohol by entrainment with the excess air are sharply reduced as compared to conventional batch processes. When a relatively large amount of relatively concentrated fresh substrate is added to a residue of fermentation medium from a previous batch, as has heretofore been customary, the initial alcohol concentration is higher than is compatible with the optimum conversion rate to acetic acid. These shortcomings of the known processes are remedied by the method of this invention.

The invention also permits truly continuous fermentation. When the alcohol concentration of the medium is close to the minimum value desirable for viability of the microorganisms, the alcohol losses with the discharged fermentation medium are tolerable. The medium may be replenished with fresh substrate at a rate sufficient to maintain the minimum alcohol concentration, and the fermentation mixture is discharged from the fermentation zone continuously at the same rate at which fresh substrate is being supplied. The process can be carried out successfully only when the alcohol concentration in the fermentation mixture is very closely controlled. An increase in alcohol concentration entails a prohibitive loss of alcohol with the discharged medium. A reduction of alcohol concentration may affect the microorganisms. The method of the invention readily maintains the constant alcohol concentration with the required precision.

When the continuous fermentation process is carried out with an alcohol concentration close to the permissible minimum, the overall rate of conversion of the alcohol to acetic acid is relatively low. This rate may be sharply increased when the fermentation is carried out in two separate zones. The alcohol content of the waste gases from the two zones is separately determined, and the flow of liquid to and from the first zone is controlled in response to two separate signals respectively derived from the alcohol concentration of the medium in the two zones. The alcohol concentration in the first zone is preferably maintained at a value conducive to conversion of alcohol to acetic acid at the highest possible rate, and the fermentation medium is released from the first to the second zone at a rate sufficient to maintain in the latter a minimum concentration of alcohol consistent with viability of the microorganisms. The manner in which the fermentation is carried out in the second zone will be apparent from the preceding description of fermentation at minimum alcohol concentration in a single fermentation zone.

The aforedescribed continuous fermentation in two fermentation zones yields acetic acid at a particularly high rate per unit volume of fermentation vessel. It will be appreciated that the vessels respectively enclosing the two fermentation zones should preferably be matched as to their capacity and operate most advantageously with a primary substrate of fairly uniform alcohol concentration.

When the two vessels are matched to each other, the signals for control of liquid to and from the second zone may be derived from the alcohol content of the waste gases withdrawn from the second zone alone. The liquid level and the alcohol concentration in the second fermentation zone are maintained at substantially fixed values. Only the liquid level is controlled in the first fermentation zone, and is maintained by admission of fresh alcohol bearing substrate. An alcohol concentration closely approximating that required for optimum conversion rate can be maintained in the first zone in such a manner. If the two vessels are not optimally matched, steady operating conditions are established in continuous operation, but the greatest possible conversion rate is not achieved.

The exact nature of this invention as well as other objects and advantages thereof will be readily apparent from consideration of the following specification relating to the annexed drawings in which.

Figure 1:
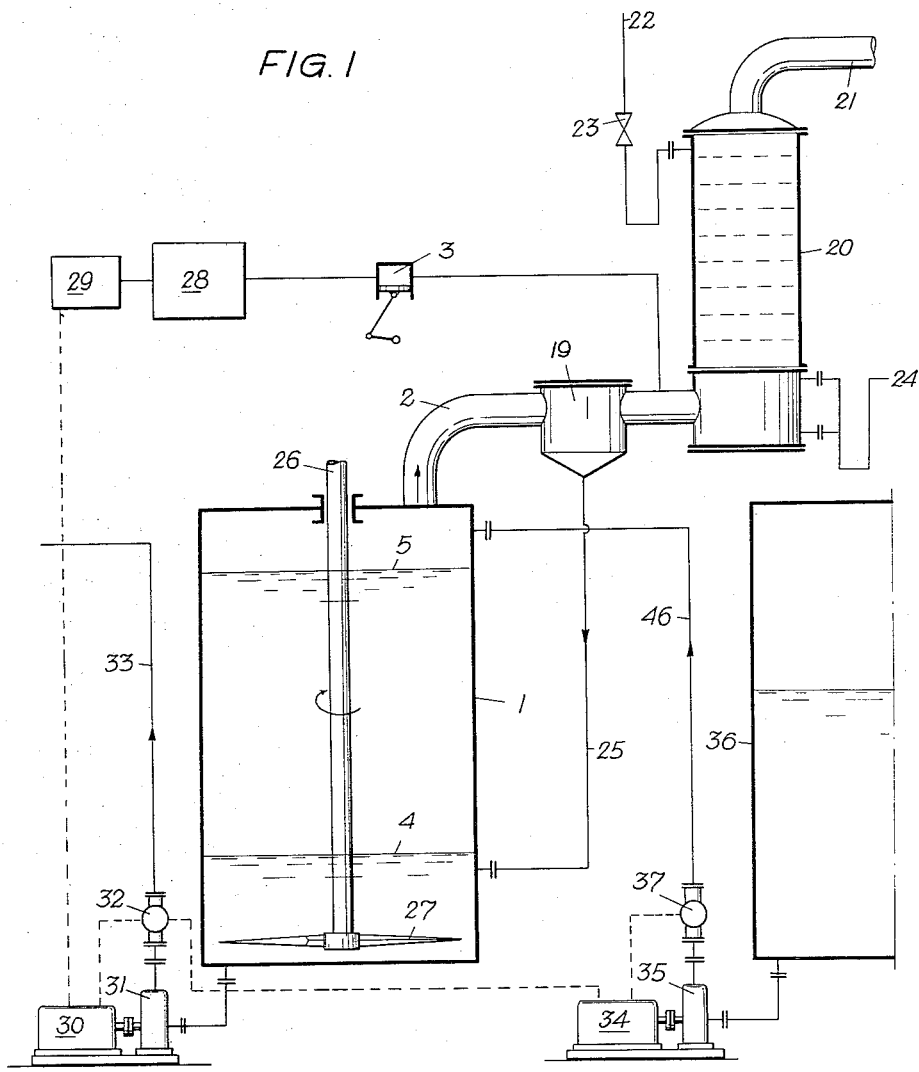
FIG. 1 shows apparatus for carrying out the method of the invention in which a major portion of a fermentation mixture is automatically discharged from a fermentation vat, and replaced by fresh alcohol-bearing substrate when the alcohol content of the mixture in the vat reaches a predetermined minimum, the view being in elevation, and partly conventional.

Referring now to the drawing in detail, and initially to FIG. 1, there is shown a fermentation vat 1 of upright cylindrical shape. An agitator having a hollow shaft 26 and hollow perforated blades 27 is mounted coaxially in the vat 1. The agitator is connected to a source of compressed air and to a drive motor in a manner conventional in this art, and not shown in the drawing. The air source preferably contains a metering valve to maintain a constant rate of air supply, the supplied air being discharged through the perforations of the blades 27.

The vat 1 is additionally equipped with heating and cooling coils and with thermostatic controls for the coils adapted to maintain a desired temperature, preferably slightly above room temperature, in a fermentation mixture contained within the vat. Since automatic temperature controls are commonly employed in this art, they have been omitted from the showing of the several figures in order not to crowd the drawing.

An exhaust conduit 2 connects the top of the vat 1 to a separator 19 of the cyclone type in which liquid is separated from the waste gas discharged from the vat 1 through the conduit 2 in the direction of the arrow. The liquid is returned to the bottom of the vat through a return pipe 25.

Gas free from entrained liquid droplets is fed from the separator 19 to the bottom of a plate column gas washer 20 where it is stripped of soluble vapors by water admitted through a supply pipe 22 equipped with a manual control valve 23. The washing liquid containing the soluble components of the waste gas is withdrawn from the bottom of the washer 20 through a discharge pipe 24. The stripped waste gas, consisting essentially of air saturated with water vapor at the temperature of the washing water is drawn from the top of the washer 20 to a non-illustrated stack or exhaust fan through a waste gas conduit 21.

The gaseous product discharged from the separator 19 is sampled by a metering pump 3 at a fixed rate, and the sample is continuously fed to a continuous analyzing unit 28 which may be of the photometric type or of the thermal type respectively described in the aforementioned patents. An output signal representative of the alcohol content of the gas sample is produced continuously or cyclically, and is fed to a control amplifier 29. The amplifier includes conventional dual position controls which generate an "off" command at an alcohol content of the gas sample above a predetermined minimum value, and an "on" command below that value.

The amplifier 29 is connected with the non-illustrated relay-switch of an electric motor 30 which drives a centrifugal pump 31. The intake of the pump is connected to the bottom of the vat 1. The discharge conduit of the pump is connected to an integrating flow meter 32 and to a pipe 33 which leads from the flow meter 32 to a non-illustrated storage tank. The flow meter is of the type which closes a circuit when a certain amount of liquid has passed therethrough, and thereby resets itself to zero. The signal generated by the flow meter is also available for controlling other devices.

As conventionally indicated by broken lines, the flow meter 32 is arranged in circuit with the non-illustrated relay switches of the pump motor 30 and of another electric motor 34 which drives a centrifugal pump 35. The intake of the latter is connected to a storage tank 36. The discharge end of the pump 35 is connected through a flow meter 37 and a feed pipe 46 to the upper portion of the vat 1. The flow meter 37 is of the same type as the afore-described meter 32. It is arranged in circuit with the switch relay of the motor 34.

The apparatus further includes check valves in the various liquid containing conduits as needed for operation, and such valves have not been shown.

The afore-described apparatus is operated as follows:

An aqueous alcohol-bearing substrate, for example, a mash containing between 5 and 10 percent alcohol, is pumped by the pump 35 from the storage tank 36 into the vat 1 when the motor 34 is started manually. The vat is originally filled to the minimum level 4 with an aqueous fermentation medium containing sufficient microorganisms of the genus Acetobacter to start fermentation. The medium contains enough alcohol to keep the microorganisms in viable condition, for example, one percent by volume.

The flow meter 37 is set for a liquid volume sufficient to raise the level in the vat 1 from the minimum level 4 to a maximum level 5 before the signal generating circuit of the meter 37 is closed. Upon such closing, the motor 34 is automatically shut off.

The supply of air to the agitator 26, 27 and the water supply to the column 20 are opened. The non-illustrated motor of the agitator and the non-illustrated drive motor of the metering pump 3 are started, and all control devices are energized. The apparatus operates automatically from here on as long as a supply of fermentable substrate is available in the storage tank 36.

The fermentation mixture in the vat 1 is diluted to about four times its original volume by the freshly supplied substrate. Fermentation proceeds in the diluted mixture while air is bubbled through the agitated liquid contents of the vat from the rotating blades 27. Only a small amount of oxygen in the supplied air is consumed by the fermentation. The excess air is saturated with water vapor and alcohol vapor at the temperature of the fermentation mixture which is held constant at 30° C.

The excess air discharged through the conduit 2 is continuously analyzed for alcohol content in the unit 28. As the fermentation proceeds, the alcohol content of the fermentation mixture gradually drops from an initial maximum value somewhat above 5 percent until it approaches 0.15 percent. A command issued by the control amplifier 29 in response to a signal of the analyzing unit starts the motor 30, and the pump 31 transfers fermentation mixture from the vat 1 through the flow meter 32 and the pipe 33 to the non-illustrated acid storage tank for further processing not in itself relevent to this invention.

When the minimum liquid level 4 in the vat 1 is reached by removal of a suitable volume of fermentation mixture, the flow meter 32 stops the motor 30 and starts the motor 34. A new processing cycle begins with replenishment of the residual fermentation mixture in the vat 1 by fresh alcohol-bearing substrate from the storage tank 36.

When the pump 35 and associated elements of the substrate feeding mechanism are suitably selected, the fresh substrate is supplied to the vat 1 at a rate which spreads the feeding of fresh mash over a major portion of the fermentation cycle. If the mash is of a known constant composition, an alcohol concentration corresponding to the highest rate of conversion to acetic acid can be closely approximated in the vat 1 during the mash feeding period at a constant feeding rate. This favorable conversion rate is automatically maintained by the relatively simple control arrangement shown in FIG. 1.

Figure 2:
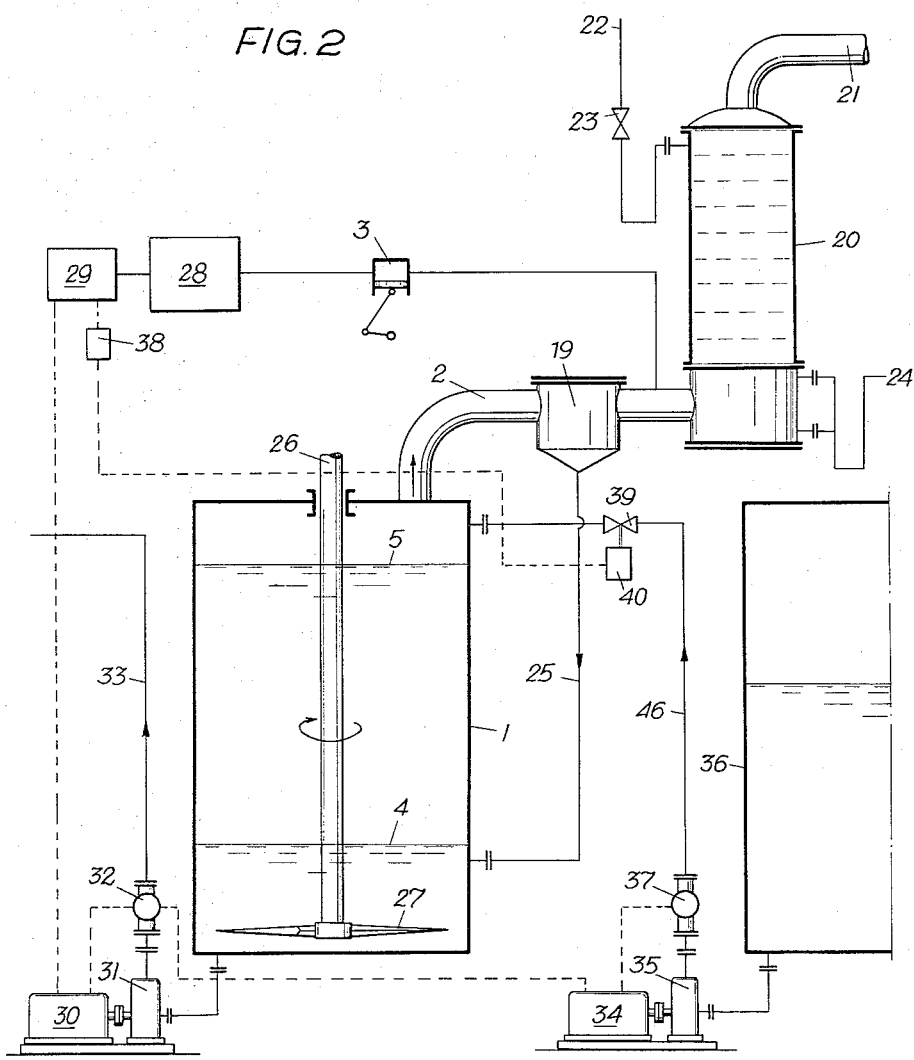
FIG. 2 shows a modification of the apparatus of FIG. 1 which additionally permits a predetermined maximum alcohol concentration to be maintained in the fermentation vat over most of the fermentation period.

When a constant alcohol content cannot be maintained in the substrate supplied, and when optimum conversion conditions are to prevail in the vat 1 for the greatest possible portion of the fermentation cycle, the arrangement shown in FIG. 2 is preferred. It differs from the apparatus illustrated in FIG. 1 by the addition of a controller 38 connected to the amplifier 29, and of a control valve 39 arranged in the feed pipe 46 and operated by a servo motor 40 connected to the controller 38.

The controller 38 receives the amplified signal of the analyzing unit 28 and operates in the ternary combination of the proportional, integral, and derivative modes. The position of the throttling control valve 39 determines the output of the centrifugal pump 35.

The operation of the apparatus shown in FIG. 2 is similar to that of the afore-described apparatus of FIG. 1, but the feeding rate of fresh substrate from the storage tank 36 to the vat 1 is controlled by the valve 39 in such a manner that a desired alcohol concentration is maintained in the fermentation mixture as long as the motor 34 is energized. The desired alcohol concentration may be set on the controller 38. When the liquid in the vat 1 has been replenished by the fed substrate to the maximum level 5, the pump 35 is stopped in the afore-described manner, and the alcohol concentration in the vat 1 is permitted to drop until the motor 30 is energized to transfer about three quarters of the fermentation mixture to the non-illustrated acid storage tank, whereupon the feeding phase of a new cycle begins automatically.

It will be appreciated that a dual position controller may replace the controller 38, and that the servo-motor 40 may be replaced by a solenoid cooperating with a spring to operate a shut-off valve equipped with a by-pass for permanent minimum flow in a manner conventional in itself. However, control of the alcohol concentration in the vat 1 by continuous variation of the feed rate in response to an error signal is preferred.

Figure 3:
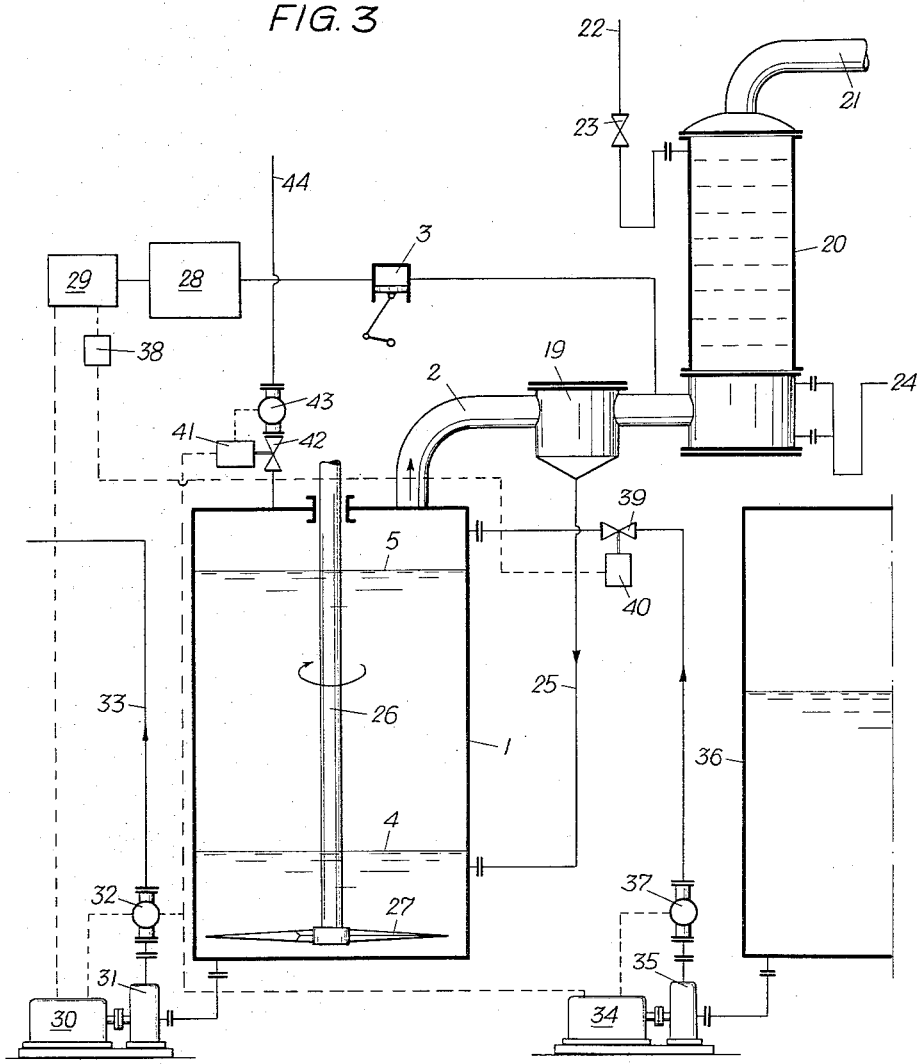
FIG. 3 shows a further modification of the apparatus of FIG. 2.

When the substrate to be fermented has an alcohol content of more than 10 percent, it is preferred further to modify the apparatus illustrated in FIG. 2 as is shown in FIG. 3.

FIG. 3 shows all the elements seen in FIG. 2, and these elements are connected in the same manner. The preceding description of FIGS. 1 and 2 is thus applicable to FIG. 3. FIG. 3 additionally illustrates a water line 44 which leads from a non-illustrated water supply to the top of the vat 1. A flow meter 43 equipped to reset itself and to close a control circuit at an adjustable reading in the manner of the meters 32, 37 is arranged in the water line 44. A normally closed shut-off valve 42 operated by a solenoid 41 is interposed in the line 44 between the meter 43 and the vat 1.

The solenoid 41 is arranged in circuit with the flow meter 32 in such a manner that the valve 42 is opened when the motor 34 is started by the flow meter 32. The solenoid 41 is also connected with the control circuit of the flow meter 43 to permit closing of the valve 42 by its return spring when a pre-set amount of water has passed through the flow meter 43. The effective flow section of the line 44 is selected to be sufficiently small so that the desired optimum alcohol concentration in the vat 1 may be maintained by the controller 38 in the manner described hereinabove with reference to the apparatus shown in FIG. 2.

The devices described so far operate without intervention of an operator after they have been started, and perform continuous batch processes. A process according to this invention in which material to be fermented moves in a continuous stream may be performed in the relatively simple apparatus shown in FIG. 4.

The vat 1 is equipped with an air feeding agitator 26, 27. The excess air discharged through a conduit 2 is separated from entrained liquid in a separator 19 which returns the liquid to the vat through a return pipe 25. The waste gas is scrubbed in a colunm 20 with water admitted to the column through a supply pipe 22 at a rate set by a valve 23, the liquid being withdrawn from the column through a discharge pipe 24. A sample of the gas free from liquid is taken by a metering pump 3, and analyzed in an analyzing unit 28. The signal generated by the analyzing unit is amplified in an amplifier 29 and fed to a controller 38. Fresh alcohol-bearing substrate is fed from a storage tank 36 by a pump 35 to the vat 1 through a feed pipe 46 equipped with a control valve 39. The valve is operated by a servo-motor 40 connected to the controller 38.

Figure 4:
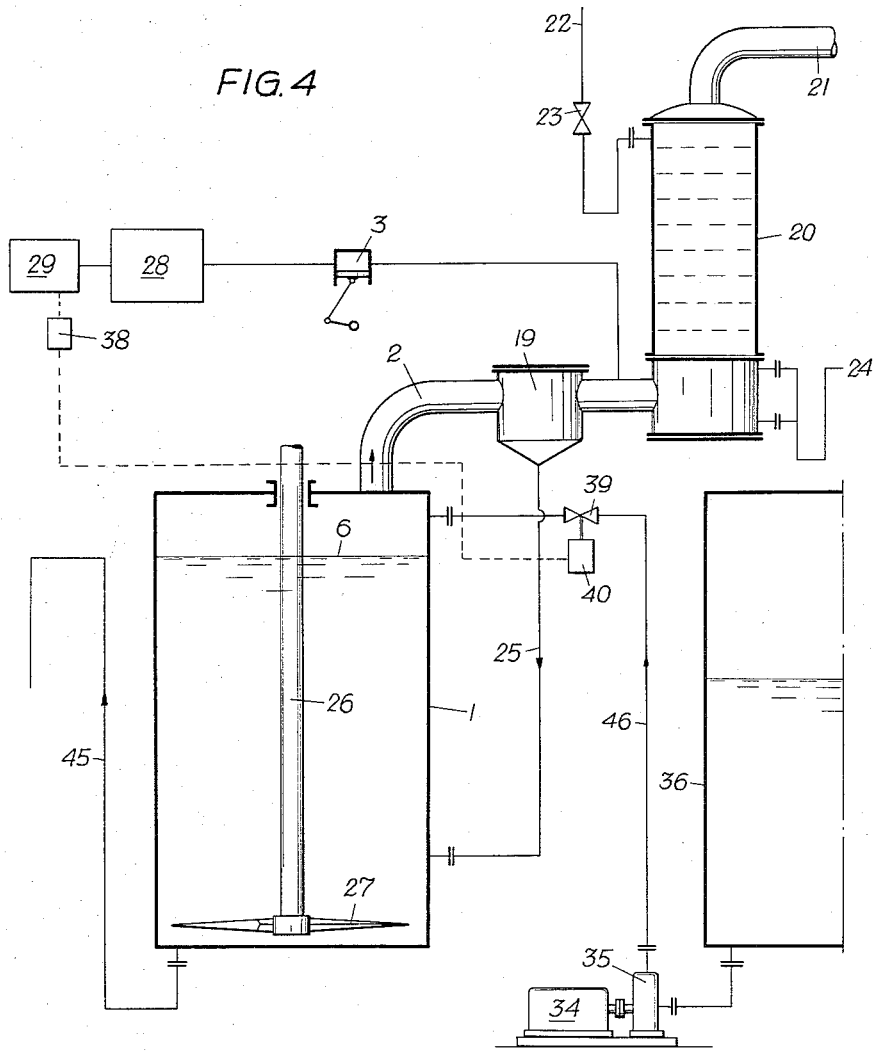
FIG. 4 illustrates apparatus for fermentative oxidation of alcohol to acetic acid in continuous stream through a single vat, the view corresponding to those of FIGS. 1 to 3.

The elements enumerated so far are common to the devices shown in FIGS. 2, 3, and 4. Their function and operation are modified in the apparatus illustrated in FIG. 4 by the following features:

The bottom of the vat 1 is connected with a permanently open overflow pipe 45 arranged to maintain a constant liquid level 6 in the vat 1. The motor 34 is controlled by a non-illustrated starter switch which may be manual. The motor 34 runs continuously during the operation of the fermentation apparatus. The controller 38 is set for maintaining the alcohol concentration of the fermentation mixture in the vat 1 at a value identical with or only slightly greater than the minimum value necessary for functioning of the microorganisms which oxidize the alcohol supplied.

The consumption of alcohol by the microorganisms in the vat 1 is automatically balanced by fresh substrate supplied from the tank 36. A volume of fermentation mixture equal to the volume of freshly supplied substrate is discharged simultaneously from the overflow pipe 45. The stream of material through the apparatus is continuous. Acetic acid is produced at a relatively low rate per unit volume of the vat 1, but the apparatus shown in FIG. 4 is most economical where the alcohol concentration of the original substrate is too low for operation at the optimum rate of which the mircroorganisms are capable.

Figure 5:
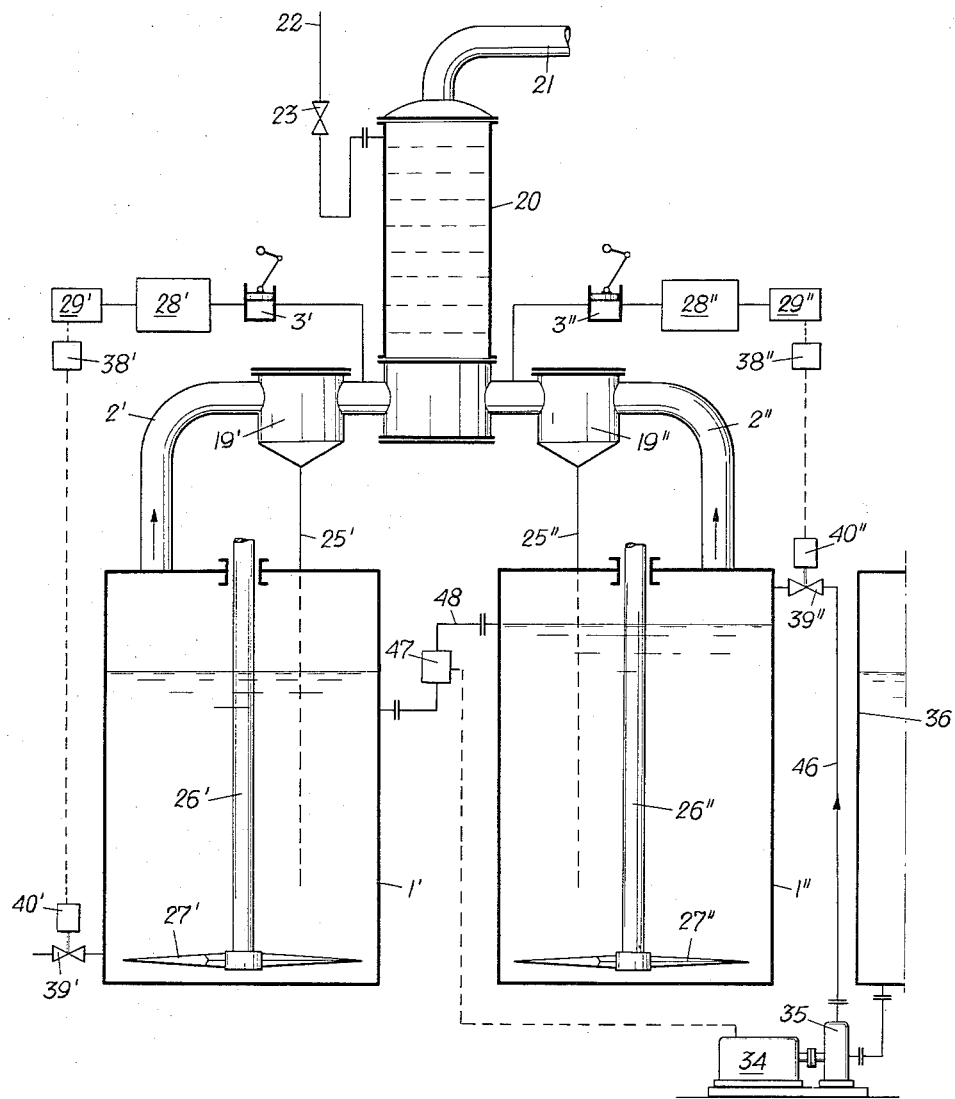
FIG. 5 shows a dual-vat installation for oxidation of alcohol in a continuous stream in which the composition of the fermentation mixture in each vat is separately determined and controlled.

The apparatus shown in FIG. 5 and modified versions thereof are preferred for continuous fermentative oxidation of alcohol available in concentrations higher than the concentration necessary for highest conversion rate.

As shown in FIG. 5, the two vats 1', 1" containing respective batches of Acetobacter are equipped with agitators 26', 27' and 26", 27" respectively. Excess air approximately saturated with water and alcohol and carrying liquid droplets is discharged through exhaust conduits 2', 2" to separators 19', 19" from which liquid is returned to the respective vats through return pipes 25', 25". The separators 19', 19" are connected to a common gas washer 20 equipped in a manner evident from FIGS. 1 to 4, but only partly shown in FIG. 5.

Separate metering pumps 3', 3" sample the waste gases of the two vats 1', 1" after they have been separated from entrained liquid. The samples are separately analyzed in units 28', 28". The signals of the analyzing units are respectively amplified in amplifiers 29', 29", and fed to controllers 38', 38". A pump 35 driven by a motor 34 draws fresh aqueous alcohol-bearing liquid from a storage tank 36, and feeds the substrate through a feed pipe 46 and a control valve 39" to the top of the first vat 1". The valve 39" is operated by a servo-motor 40" under the command of the controller 38".

A permanently open overflow pipe 48 connects the vat 1" to the vat 1'. A flow-sensitive switch 47 arranged in the pipe 48 is connected to the motor 34 to stop the motor when flow in the pipe 48 stops. A discharge valve 39' at the bottom of the vat 1' is operated by a servo-motor 40' under the command of the controller 38'. The valve 39' is connected to an acid storage tank in a manner not shown in the drawing.

The apparatus shown in FIG. 5 is operated in a manner partly apparent from the preceding description of FIGS. 1 to 4 as follows:

The controller 38", which is of the same type as the afore-described controller 38, is set to maintain in the vat 1" an alcohol concentration at which the alcohol is converted to acetic acid at the highest available rate, at the prevailing temperature, for example, 5.5 percent by volume for an operating temperature of 27° C. Fresh substrate of a higher concentration is automatically supplied at the necessary rate through the valve 39". Fermentation mixture is simultaneously discharged at the same rate through the overflow pipe 48 to the vat 1'.

The controller 38' is set for an alcohol concentration between 0.1 and 0.15 percent corresponding to the minimum alcohol concentration at which the microorganisms of the batch employed in vat 1' can maintain their function. When the alcohol concentration in the vat 1' exceeds the desired value, flow of liquid through the valve 39' is reduced to increase the dwell time of the fementation mixture in the vat 1', and vice versa.

If a fermentation mixture relatively rich in alcohol is transferred through the overflow pipe 48 to the vat 1' at a rate higher than the alcohol can be oxidized in the vat 1' by the microorganisms present, the level in the vat 1' rises. Eventually, the flow in the pipe 48 stops when the liquid level in both vats becomes the same, and the flow sensitive switch 47 deenergizes the motor 34 until the alcohol concentration in the mixture of the vat 1' is reduced sufficiently to permit discharge through the valve 39'. The motor 34 is started again and normal operation is resumed.

While the motor 34 is stopped, the alcohol concentration in the vat 1" drops below the desired value, and stoppage of the motor 34 should be avoided or held to a minimum if operation of the equipment at the highest possible output rate is desired. Those skilled in the art will readily calculate the necessary ratio of the volumes of vats 1', 1" which provides adequate dwell time for the fermentation mixture in both vats under any specific set of operating conditions including the approximate alcohol concentration in the substrate supplied, the desired fermentation temperature, the properties of the specific strain of Acetobacter employed, and the like. With vats 1', 1" of suitably matched capacity, the flow of liquid through the apparatus can be made continuous, and the function of the switch 47 is limited to that of a safety device. Even when operated at conditions not ideally suited to the volume ratio of the available vats 1', 1", the apparatus shown in FIG. 5 oxidizes alcohol to acetic acid in continuous automatic operation.

Figure 6:
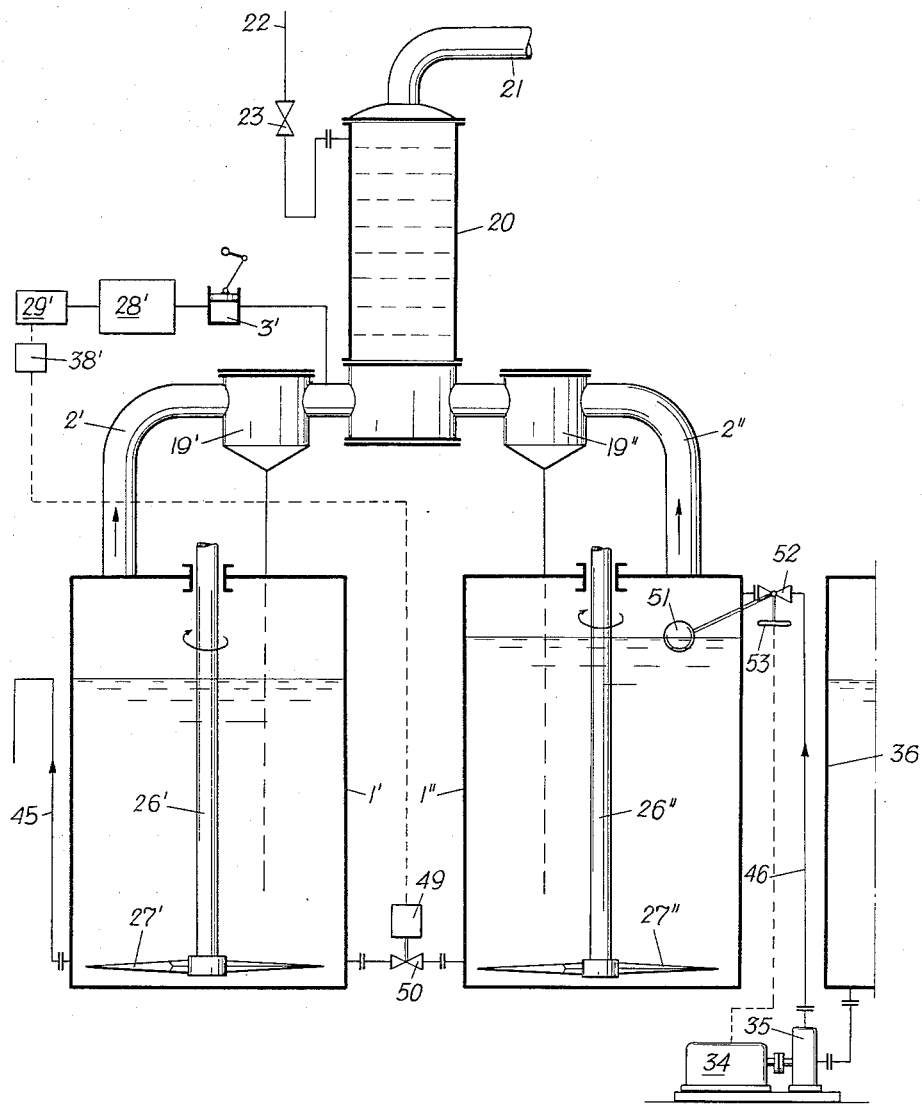
FIG. 6 illustrates a modification of the apparatus of FIG. 5 in which only the alcohol concentration in one of the two vats is determined.

When the supply of alcohol-bearing substrate to be fermented varies but little in alcohol content, continuous operation at output rates approaching those of the apparatus illustrated in FIG. 5 can be achieved with a simpler device illustrated in FIG. 6.

The two vats 1', 1" shown in FIG. 6 are equipped with air supplying agitators, and discharge their waste gases through separators 19', 19" into a common gas washer 20 in the manner described with reference to FIG. 5. Fresh substrate is fed to the vat 1" from a storage tank 36 by a pump 35 driven by a motor 34. A feed pipe 46 connects the pump 35 to the tank 1". Liquid flow through the pipe 46 is controlled by a valve 52 operated by a float 51 in the vat 1" in such a manner as to maintain a constant liquid level in the vat. A mercury switch 53 connected to the float 51 and arranged in circuit with the motor 34 assists the valve 52. The respective bottom portions of the vats 1', 1" are connected by a valve 50 operated by a servo-motor 49. A constant liquid level 6 is maintained in the vat 1' by an overflow pipe 45.

The exhausted waste gas from the vat 1' is sampled by a metering pump 3', and analyzed by a unit 28'. The signal of the unit 28', modified in the amplifier 29', is fed to a controller 38' which commands the servo-motor 49.

The controller 38' is set to maintain the alcohol concentration in the vat 1' barely above the minimum consistent with viability of the microorganisms in the vat. When the alcohol concentration drops to that value, more concentrated fermentation mixture is admitted from the vat 1" through the valve 50. Simultaneously, converted fermentation mixture is discharged at the same rate from the overflow pipe 45 to storage, and fresh substrate is admitted at the same rate from the tank 36 to maintain the constant level in the vat 1".

If the capacities of the vats 1', 1" are properly matched to the alcohol concentration in the freshly supplied substrate and to other specific conditions of operation, the fermentation in the vat 1" is carried out at a substantially constant alcohol concentration suitable for conversion of the alcohol to acetic acid at the highest rate of which the microorganisms used are capable.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What we claim is:

1. A method of oxidizing alcohol to acetic acid which comprises:
   (a) feeding an alcohol bearing aqueous substrate to a fermentation medium in a first container, whereby a mixture of said medium and of said substrate is formed, said medium including a first batch of microorganisms adapted gradually to oxidize said alcohol to acetic acid in the presence of oxygen;
   (b) feeding excess air to said container, whereby the alcohol in said mixture is gradually oxidized to acetic acid by said microorganisms;
   (c) withdrawing a first waste gas from said container, said gas consisting mainly of air saturated with vapors of water and of alcohol;
   (d) generating a first signal in response to the alcohol content of said waste gas;
   (e) controlling the feeding of said substrate to said first container in response to said first signal in such a manner as to maintain a first substantially constant alcohol concentration in the mixture in said first container;
   (f) transferring a portion of said mixture from said first container to a fermentation medium in a second container, the last-mentioned medium including a second batch of said microorganisms, whereby another mixture is formed in said second container;
   (g) feeding excess air to said second container, whereby alcohol in the said second mixture is gradually oxidized to acetic acid by the microorganisms in said second container;
   (h) withdrawing a second waste gas from said second container, said second waste gas consisting mainly of air saturated with vapors of water and of alcohol;
   (i) generating a second signal in response to the alcohol content of said second waste gas; and
   (j) controlling the transferring of said portion of a mixture from said first container to said second container in response to said second signal in such a manner as to maintain a second substantially constant alcohol concentration in the other mixture in said second container, said second concentration being lower than said first concentration.

2. A method of oxidizing alcohol to acetic acid which comprises:
   (a) admixing an alcohol bearing aqueous substrate to a liquid fermentation medium in a first container, whereby a liquid mixture is formed, said medium including a first batch of microorganisms adapted gradually to oxidize said alcohol to acetic acid in the presence of oxygen;
   (b) feeding excess air to said container, whereby the alcohol in said mixture is gradually oxidized to acetic acid by said microorganisms;
   (c) withdrawing a first waste gas from said container, said gas consisting mainly of air saturated with vapors of water and of alcohol;
   (d) transferring a portion of the mixture in said first container to a second container containing a second batch of said microorganisms, whereby another mixture is formed;
   (e) feeding excess air to said second container, whereby alcohol in the transferred portion is oxidized to acetic acid by the microorganisms in said second container;

(f) withdrawing a second waste gas from said second container, said second waste gas consisting mainly of air saturated with vapors of water and of alcohol;
(g) generating a signal in response to the alcohol content of one of said waste gases; and
(h) controlling the transferring of said portion in response to the signal generated.

3. A method as set forth in claim 2, wherein said signal is generated in response to the alcohol content of said second waste gas, and said transferring is controlled in response to said signal in such a manner as to maintain the alcohol concentration of said other mixture substantially constant.

References Cited by the Examiner

UNITED STATES PATENTS

| 1,732,921 | 10/1929 | Bratton | 99—147 X |
| 2,997,424 | 8/1961 | Mayer | 195—49 |
| 3,002,894 | 10/1961 | Rungaldier et al. | 195—117 |
| 3,010,881 | 11/1961 | Markhof | 195—117 |
| 3,014,804 | 12/1961 | Els et al. | 99—147 |
| 3,032,476 | 5/1962 | Sher | 195—115 X |

A. LOUIS MONACELL, *Primary Examiner.*

L. M. SHAPIRO, *Assistant Examiner.*